United States Patent
Long et al.

(10) Patent No.: US 7,395,264 B2
(45) Date of Patent: Jul. 1, 2008

(54) PROMOTABLE TRANSACTIONS WITH PROMOTABLE SINGLE PHASE ENLISTMENTS

(75) Inventors: Joe D. Long, Woodinville, WA (US);
James E. Johnson, Bellevue, WA (US);
Michael R. Clark, Issaquah, WA (US);
Egidio Sburlino, Seattle, WA (US);
Gert E.R. Drapers, Amerongen (NL);
Jagan M. Peri, Redmond, WA (US);
Dax H. Hawkins, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 559 days.

(21) Appl. No.: 10/898,624

(22) Filed: Jul. 23, 2004

(65) Prior Publication Data

US 2005/0289146 A1    Dec. 29, 2005

Related U.S. Application Data

(60) Provisional application No. 60/583,216, filed on Jun. 25, 2004.

(51) Int. Cl.
*G06F 7/04*    (2006.01)

(52) U.S. Cl. ...................................................... 707/10
(58) Field of Classification Search .................. 707/10, 707/1, 3, 102, 104.1; 709/219, 228; 715/738, 715/739, 748, 760, 968; 345/619, 440
See application file for complete search history.

(56) References Cited

U.S. PATENT DOCUMENTS

| | | | |
|---|---|---|---|
| 6,430,619 B1 * | 8/2002 | Sitaraman et al. | 709/225 |
| 6,546,425 B1 * | 4/2003 | Hanson et al. | 709/227 |
| 6,611,498 B1 * | 8/2003 | Baker et al. | 370/252 |
| 7,006,993 B1 * | 2/2006 | Cheong et al. | 705/38 |

* cited by examiner

*Primary Examiner*—Chong H Kim

(57) ABSTRACT

A transaction protocol is described that allows a database transaction to begin as a local, lightweight transaction without involving a distributed transaction coordinator and then be promoted to a distributed transaction only when required, e.g. when more than one database connection is required. A promotable enlistment allows a first resource to begin processing a promotable transaction. If the resource is notified that the transaction is being promoted to a distributed transaction, the resource is configured to promote the enlistment to a distributed transaction coordinator which coordinates processing of the transaction between the first resource and at least a second resource.

34 Claims, 6 Drawing Sheets

Creating a Promotable Transaction

Promotion To A Distributed Transaction

PROMOTABLE TRANSACTIONS WITH PROMOTABLE SINGLE PHASE ENLISTMENTS

RELATED APPLICATION

This application claims the benefit of U.S. Provisional Patent Application No. 60/583,216, filed on Jun. 25, 2004, entitled "Promotable Single Phase Enlistment" and assigned to Microsoft Corp.®, which is hereby incorporated by reference.

TECHNICAL FIELD

The present application is related generally to data processing. More particularly, the following description relates to database transaction protocols.

BACKGROUND

A common system topology in a database system is an application or component utilizing a single connection to a database or other resource that is a set of data desired to be transactionally consistent. Such application components are typically specialized code that can take advantage of intrinsic transaction mechanisms of the database to optimize processing performance. While this technique enhances performance, it can severely limit re-use of the component in other applications—especially if the other applications involve topologies having more than one database connection. It can also result in a more complex environment for a developer.

One way in which this problem has been handled is to construct more generalized components that are able to handle various topologies. This typically means handling a single connection topology in a similar way that a multiple connection topology is handled. But this model degrades performance by requiring a simpler topology to perform processing steps that are really only necessary with processing in a more complex topology. When such a component is used in a single connection topology, unnecessary overhead costs are thus incurred.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented below.

The following description involves a mechanism that supports more general transaction topologies without incurring the traditional overhead costs when utilizing a simple topology. A commit protocol is described that allows a transaction to begin as a local, lightweight transaction and then be promoted to a distributed transaction only when required. If promotion to a distributed transaction is not required, then certain overhead (e.g. message and logging overhead) associated with a distributed transaction can be eliminated. Typical distributed transaction costs are only incurred if and when a transaction is promoted to a distributed transaction.

In addition a promotable single phase enlistment can be used to optimize promotable transactions that require inter-process communication. With a promotable single phase enlistment, a resource is aware that it is a root of a transaction in which it is involved (i.e., the resource is required for a commit). If something occurs outside the resource that makes the transaction impossible to complete with the with the resource as the root, a promotable single phase enlistment enables the resource to make an appropriate distributed transaction coordinator the root of the transaction.

BRIEF DESCRIPTION OF THE DRAWINGS

The foregoing aspects and many of the attendant advantages of the described implementations will become more readily appreciated as the same become better understood by reference to the following detailed description, when taken in conjunction with the accompanying drawings, wherein.

DETAILED DESCRIPTION

Figure 1:
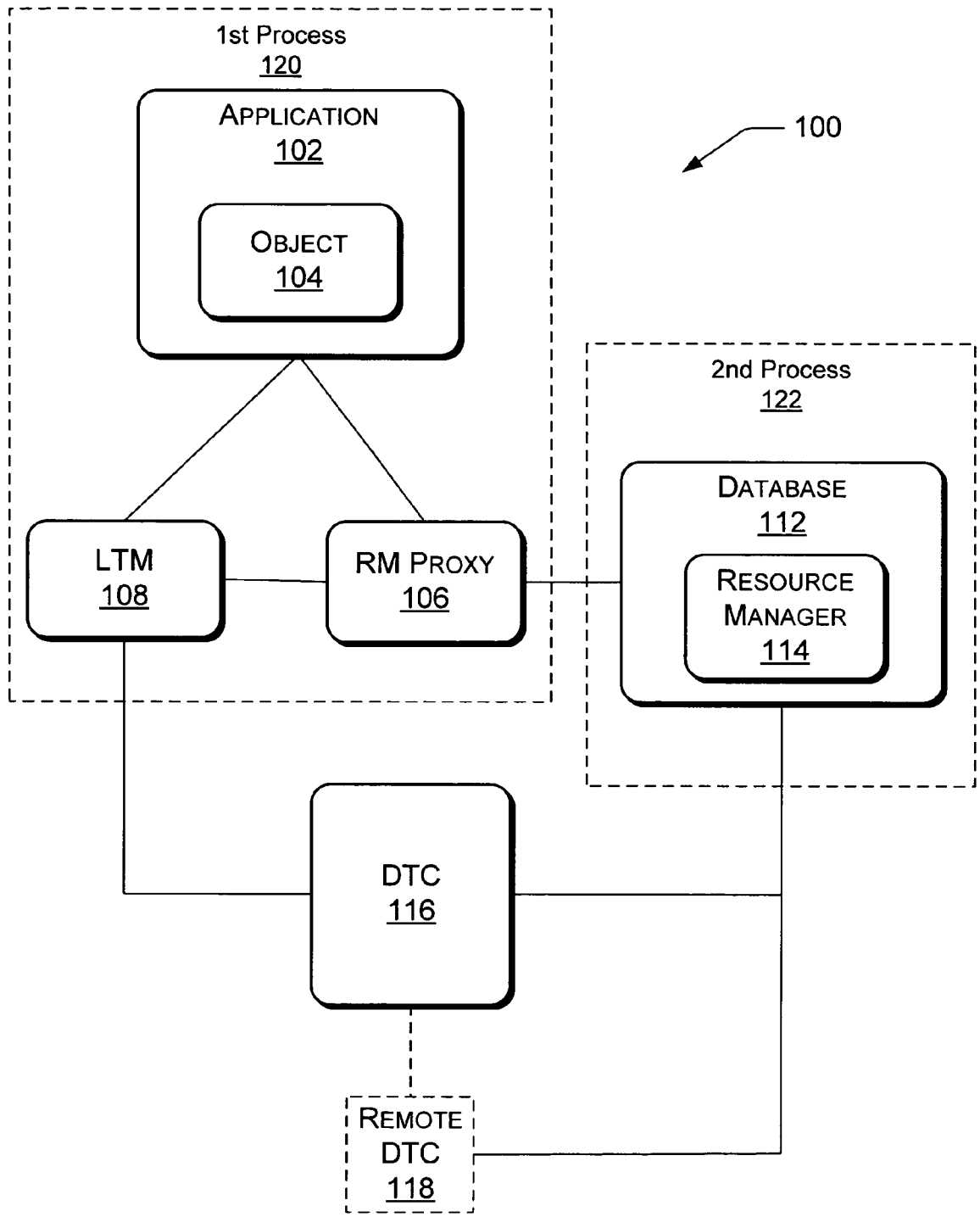
FIG. 1 is a block diagram of an exemplary database system.

While one or more specific implementations may be illustrated and described below, it will be appreciated that the described implementations are merely exemplary and that various changes may be made therein without departing from the spirit and scope of the subject matter described herein.

A feature common to most database systems is a transaction, which may be defined as a logical unit of work. Although a transaction may contain a series of database statements (e.g., select, insert, update, delete, etc.), by combining the individual statements within a single unit, a developer can enforce database integrity by ensuring that the multiple statements are atomic (i.e., "all or nothing") propositions. If a transaction is committed, then all modifications resulting from the execution of the statements within the transactions are made a permanent part of the database. If the transaction is rolled back for any reason, then none of the modifications are made permanent. As a result, the database never ends up in an inconsistent state.

A common example of transaction processing involves a banking transaction such as a debit-credit transaction. The processes of debiting a first account and then crediting a second account are considered to constitute a logical unit of work and are therefore wrapped in a transaction. The second account is not credited unless the system is also able to debit the first account. By using an atomic transaction, the entire operation either succeeds or fails.

A transaction goes through several phases. Before the transaction starts, the database is in a consistent state. An application signals the start of a transaction and then begins to modify data one entry at a time, caching intermediate results. When the transaction is committed, the modifications are made a permanent part of the database. If the modifications were made separately instead of as a whole and one or more modifications were unsuccessful, the database would be left in a temporarily inconsistent intermediate state.

If the application encounters some error that prevents it from completing the transaction, it rolls back the transaction and, with it, all the data modifications. This returns the database to the point of consistency it was at before the transaction started.

One of the more common database system topologies involves the use of multiple database connections. When multiple database connections are utilized, a multiple phase commit protocol (e.g. a two phase commit) is used to coordinate commitments from more than one database or other resource. In such a topology, a distributed transaction coordinator (DTC) is utilized to coordinate a transaction between the multiple databases.

Another common database system topology involves an application (or a component of an application) using a single database connection. In such cases, a single phase commit protocol can be used because a commitment is only required from a single resource. Additionally, no coordination of resources is required. To optimize performance, an application component can be specifically written to utilize intrinsic database functionality when a developer knows that the application component will only use the single resource. While such specific coding optimizes performance, it limits future use of the code for other applications and results in a more complex environment that must be maintained.

Therefore, to support portability, many application components are written generically so that transactions are supported whether they involve a single database connection or multiple database connections. This means that a DTC is set up to be involved in the transaction even when the DTC is unnecessary; i.e. when there is only a single database in use. When a single resource is being utilized, a DTC can make an optimization to use a single phase commit protocol and thus avoid some log write overhead. But even when the optimized protocol is used, this process still involved interprocess communication to set up the DTC and to propagate the commit decision.

An in-memory transaction manager is described herein (i.e. a "lightweight transaction manager" or LTM) that serves as a proxy for a distributed transaction coordinator. The LTM is configured to recognize when a transaction utilizes a single resource and to coordinate such a transaction directly with the single resource in lieu of calling the DTC to coordinate the transaction. The DTC is therefore not called for transactions that merely involve a single resource within the same process.

If the LTM subsequently determines that the DTC is required to complete the transaction, the LTM then promotes the transaction to employ the DTC. Only then are the typical overhead costs associated with a distributed transaction incurred. In addition, such transactions may utilize a promotable single phase enlistment that enables the database to act as the root of the transaction where possible and to promote the transaction to an appropriate DTC when necessary.

In addition to the optimization of the single phase commit that economizes log write operations, the promotable enlistment optimization economizes interprocess communication between the DTC and the database.

The present application therefore describes a mechanism that supports more general transaction topologies without incurring traditional overhead costs when utilizing a topology that involves a single resource or in memory volatile resources.

In the present description, a lightweight transaction denotes a transaction that can be directly promoted to a resource (i.e. a resource manager) or a proxy thereof. A lightweight transaction can be performed without invoking a DTC. A distributed transaction is a transaction that requires coordination between two or more durable resources by a DTC.

It is also noted that while the term "resource" as used herein typically refers to a database, a resource may—in another context—refer to an object other than a database in which it is important to provide transactional semantics. Other resources include, but are not limited to, lists, tables, and the like and may or may not reside in memory. It is also noted that a reference to communication with a resource may also mean communication with a resource manager associated with the resource or a resource manager proxy.

As described herein, a lightweight transaction manager communicates with in-memory objects. Therefore, if a durable resource is in memory, the LTM can communicate directly with it. If the durable resource resides in another process, the LTM can communicate with an in-memory resource proxy.

Exemplary Database System

FIG. 1 is a block diagram of an exemplary database system 100. While elements of the exemplary database system 100 are shown in conjunction with each other without regard for actual in situ requirements, it is noted that the elements of the exemplary database system 100 may reside on a single computing device or multiple computing devices, in a single process or in multiple processes. Furthermore, when situated on more than one computing device, it is noted that multiple instances of one or more of the elements may be required. However, the elements in the exemplary database system 100 are shown and described in a general sense with regard to FIG. 1.

The exemplary database system 100 includes an application 102 that has at least an application object 104, a resource manager (RM) proxy 106, a lightweight transaction manager (LTM) 108 (which serves as a proxy to the distributed transaction coordinator) and at least one resource, or database 112 that includes a resource manager 114. The application object 104 can invoke the resource manager 114 through one or more calls to the RM proxy 106, which is transparent to the application object 104. The application object 104 may also invoke the LTM 108 which, in turn, invokes the resource manager 114 through the RM proxy 106.

Although shown as two separate entities, it is noted that the database 112 and the resource manager 114 may be a single module. Here, the resource manager 114 includes logic to handle communications with a requesting consumer and/or the RM proxy 106, and the database 112 is data controlled by the resource manager 114.

For purposes of the present discussion, the application 102, application object 104, RM proxy 106 and the LTM 108 reside in a first process 120. The database 112 and the resource manager 114 reside in a second process 122. Communication, therefore, between the first process 120 and the second process 122 is necessarily inter-process communication.

The exemplary database system 100 also includes a distributed transaction coordinator (DTC) 116. A remote distributed transaction coordinator (RDTC) 118 may also be utilized in a distributed transaction with one or more other resources. The RDTC 118 may communicate with the DTC 116 and/or the resource manager 114.

Among other things, the resource manager 114 is configured to request coordination control of a transaction once it has been enlisted in the transaction, and the lightweight transaction manager 108 is configured to request that the resource manager 114 promote the transaction to a fully distributed transaction via the distributed transaction coordinator 124 in the event that the lightweight transaction manager 108 determines that the transaction requires distribution. This concept is referred to herein as a promotable enlistment or a promotable single phase enlistment.

If the LTM 106 determines that a transaction can be accomplished locally by the resource manager 114, then the resource manager 114 coordinates the transaction. This determination may be done in one of several ways. In one implementation, the resource manager 114 determines when a transaction can be handled locally and requests local control for such a situation from the transaction manager 106. In an alternative implementation, the transaction manager 106 determines whether the transaction can be handled by the resource manager 114 (or at least a properly configured resource manager) and transfers control in such instances to the resource manager 114.

The resource manager 114 is similar to a typical resource manager but also supports a promotable version of its intrinsic transactions. If a transaction is initially allocated to the resource manager 114 and it is later determined that the transaction should be promoted to a fully distributed transaction, the resource manager 114 relinquishes control of the transaction and the transaction manager proxy 108 transfers control of the transaction to the DTC 116 for subsequent processing. In at least one implementation, the resource manager 114 is configured to promote its enlistment directly to an appropriate DTC, such as the remote DTC 118.

Only when a transaction is promoted to a distributed transaction are the typical overhead costs associated with a distributed transaction incurred. Transactions that are handled locally save significant overhead resources. Details of the promotable enlistments will be described in greater detail below.

It is noted that the location and/or juxtaposition of one or more of the elements may differ in alternative implementations. For example, in at least one implementation, the distributed transaction coordinator 116 may be logically located within the lightweight transaction manager 108.

Features shown and described in the exemplary database system 100 shown in FIG. 1 and additional features and/or elements will be shown and described in greater detail below, with respect to subsequent figures.

Exemplary Methodological Implementation

Figure 2:
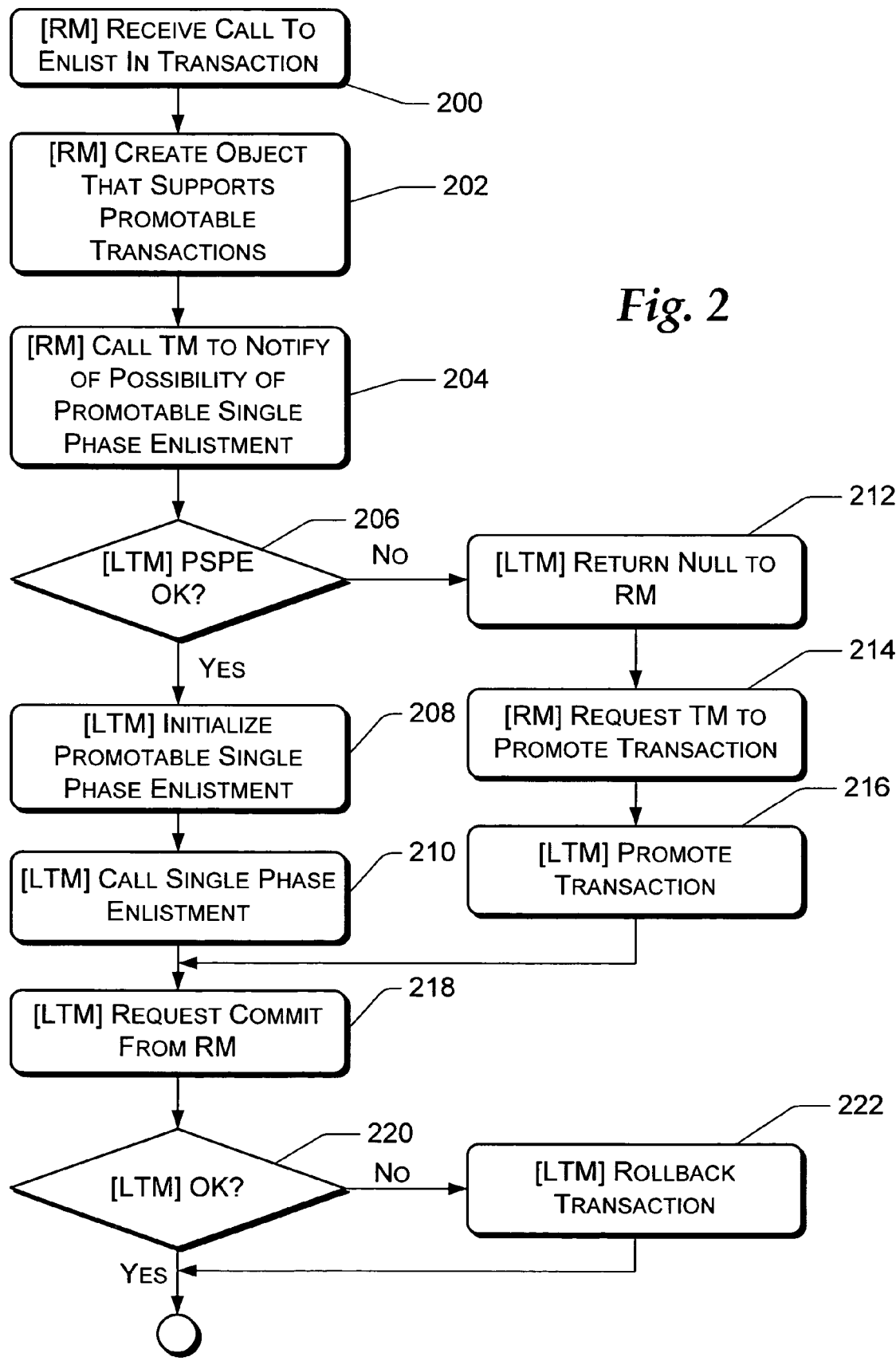
FIG. 2 is a flow diagram depicting an exemplary methodological implementation of promotable transactions.

FIG. 2 is a flow diagram depicting an exemplary methodological implementation of promotable transactions. In the following discussion, continuing reference will be made to the elements and reference numerals of the exemplary database system 100 shown in FIG. 1. It is noted that some blocks shown in FIG. 2 include steps performed by the resource manager 114 [RM] and some blocks include steps performed by the lightweight transaction manager 108 [LTM]. Although the specific tasks are shown delegated between the resource manager 114 and the LTM 108, in one or more alternative implementations, the allocation of the tasks may be different from that shown.

At block 200, the RM proxy 106 receives a notification to create a transaction from the application object 104 which, after the transaction is created, enlists the resource manager 114 in the transaction. The RM proxy 106 is configured so that the transaction creation notification is recognized without regard for the protocol utilized by the application object 104. In other words, the RM proxy 106 recognizes the notification whether it is made through ODBC (Open Data Connectivity interface), ADO (ActiveX Data Object), ADO.NET (ADO for Microsoft Corp.® .NET framework), etc.

If the resource manager 114 is configured to handle the transaction locally, the resource manager 114 creates an object that supports promotable transactions at block 202.

The resource manager 114 then notifies the lightweight transaction manager 108 (block 204) that it is configured to handle promotable enlistments.

At block 206, the LTM 108 determines the current transaction can be handled as a promotable transaction. There may be several possible scenarios where the lightweight transaction manager 108 cannot support such a transaction. For example, when the transaction has already been promoted to a distributed transaction, when the LTM has a promotable enlistment, when the LTM 108 has a durable enlistment, or the LTM 108 has allocated an identifier from a distributed transaction manager. If the lightweight transaction manager 108 determines that it cannot support a promotable enlistment on the, then the RM proxy 106 must marshal the transaction or use some other means to get the transaction to the resource manager 114.

If the LTM 108 determines that it can support the promotable enlistment ("Yes" branch, block 206), the LTM 108 initializes a promotable single phase enlistment with the resource manager 114 at block 208. The LTM 108 then calls the resource manager 114 to process the transaction (block 210). The resource manager 114 is now aware that it is a root of the transaction, meaning that the resource manager 114 is aware that a commit occurs via the resource manager 114. The fact that the enlistment is promotable means that the resource manager can promote the enlistment to an appropriate DTC if the LTM 108 requests it to do so.

If the lightweight transaction manager 108 determines that it cannot support the promotable enlistment ("No" branch, block 206), then the LTM 108 returns a null value to the resource manager at block 212 (or any value that indicates it will not accept the transaction as a promotable transaction). The resource manager 114 may then request that the LTM 108 promote the transaction to a fully distributed transaction at block 214. The LTM 108 promotes the transaction to a distributed transaction at block 216. At this time, the resource manager 114 promotes its enlistment to the appropriate distributed transaction coordinator.

When a transaction gets promoted it is possible that it will already have a number of existing enlistments. For volatile enlistments, the LTM 108 may be configured to act as a multiplexer/de-multiplexer. In at least one implementation, durable two phase commit enlistments must be promoted individually because recovery information may be unique for each enlistment. In such an implementation, this means that the LTM 108 should promote at most three enlistments. One each for volatile enlistment multiplexing/de-multiplexing, one for the single durable enlistment it will support, and one for a second durable enlistment that is causing promotion. Any remaining enlistments are transferred to the DTC 116 together with any remaining transaction work when the transaction is promoted.

It is noted that this is merely an exemplary implementation and that other implementations may be configured differently to effect the promotable transaction/enlistment.

There may be other situations wherein a transaction will be promoted to a distributed transaction other than the one presently described. But since a locally executed transaction is more efficient than a distributed transaction, the transaction manager 108 should not promote a transaction until there is no alternative to doing so.

Some situations which may require that a transaction be promoted to a distributed transaction are:

(1) Two durable enlistments are created for the transaction;

(2) A single durable enlistment is created for the transaction but the resource manager 114 does not support single phase commit; and (3) The transaction is marshaled to some form for remote communication.

At block 218, the lightweight transaction manager 108 requests the resource manager 114 to commit. This is done at an appropriate time and will be done whether the transaction is promoted or not. If the resource manager 114 indicates to the lightweight transaction manager 108 that the commit has been executed ("Yes" branch, block 220), the process terminates.

If there is an error and the resource manager cannot commit ("No" branch, block 220), the LTM 108 initiates a transaction rollback procedure at block 222. During a rollback procedure, any changes made to a database will be rolled back due to an error in changes to another database.

Exemplary Implementation—SQL/.Net

The following discussion involves an implementation of promotable transaction using Microsoft Corp.® SQL (Structured Query Language) and the System.Transactions feature of the Net Framework. In the following example, specific interfaces, methods, parameters, etc. that correspond to functions outlined in the methodological implementation shown and described in FIG. 2 are provided. Continuing reference to the elements and reference numerals of the previous figures are used in the following discussion.

The initial creation of the transaction (block 200, FIG. 2) is similar to the creation of other transactions, i.e. using the Transaction.Create method of System.Transactions. The lightweight transaction manager 108 implements an interface called ILightweightTransaction. This interface provides a method, namely, PromotableSinglePhaseEnlist. If the resource manager 114 supports its own internal transaction management and also has the ability to promote two phase commit enlistments to a distributed transaction, it creates an object that supports a special interface (defined below) called IPromotableSinglePhaseNotifications. The resource manager 108 then calls the ILightweightTransaction.PromotableSinglePhaseEnlist method.

The following declarations describe the interfaces and method referenced above.

```
public interface ILightweightTransaction
{
    ISinglePhaseEnlistment
        PromotableSinglePhaseEnlist(
            IPromotableSinglePhaseNotification
                promotableSinglePhaseNotification);
}
```

The resource manager 114 provides the IPromotableSinglePhaseNotifications interface to the transaction manager 108 (block 204, FIG. 2). This interface is defined as follows:

```
public interface IPromotableSinglePhaseNotifications
{
    void Initialize( );
    void SinglePhaseCommit(ISinglePhaseEnlistment
        singlePhaseEnlistment);
    void Rollback(ISinglePhaseEnlistment
        singlePhaseEnlistment);
    ITransaction Promote( );
}
```

If the transaction manager, 108 can support this type of enlistment when called, it calls the Initialize() member (block 208, FIG. 2) and returns an ISinglePhaseEnlistment interface from the call to PromotableSinglePhaseEnlist (block 210, FIG. 2).

The lightweight transaction manager 108 calls the Promote() member to promote a lightweight transaction with a promotable single phase enlistment to a distributed transaction. The Rollback() member is called by the transaction manager 108 when a commit cannot be made by a participant to a transaction (block 222, FIG. 2).

Figure 3:
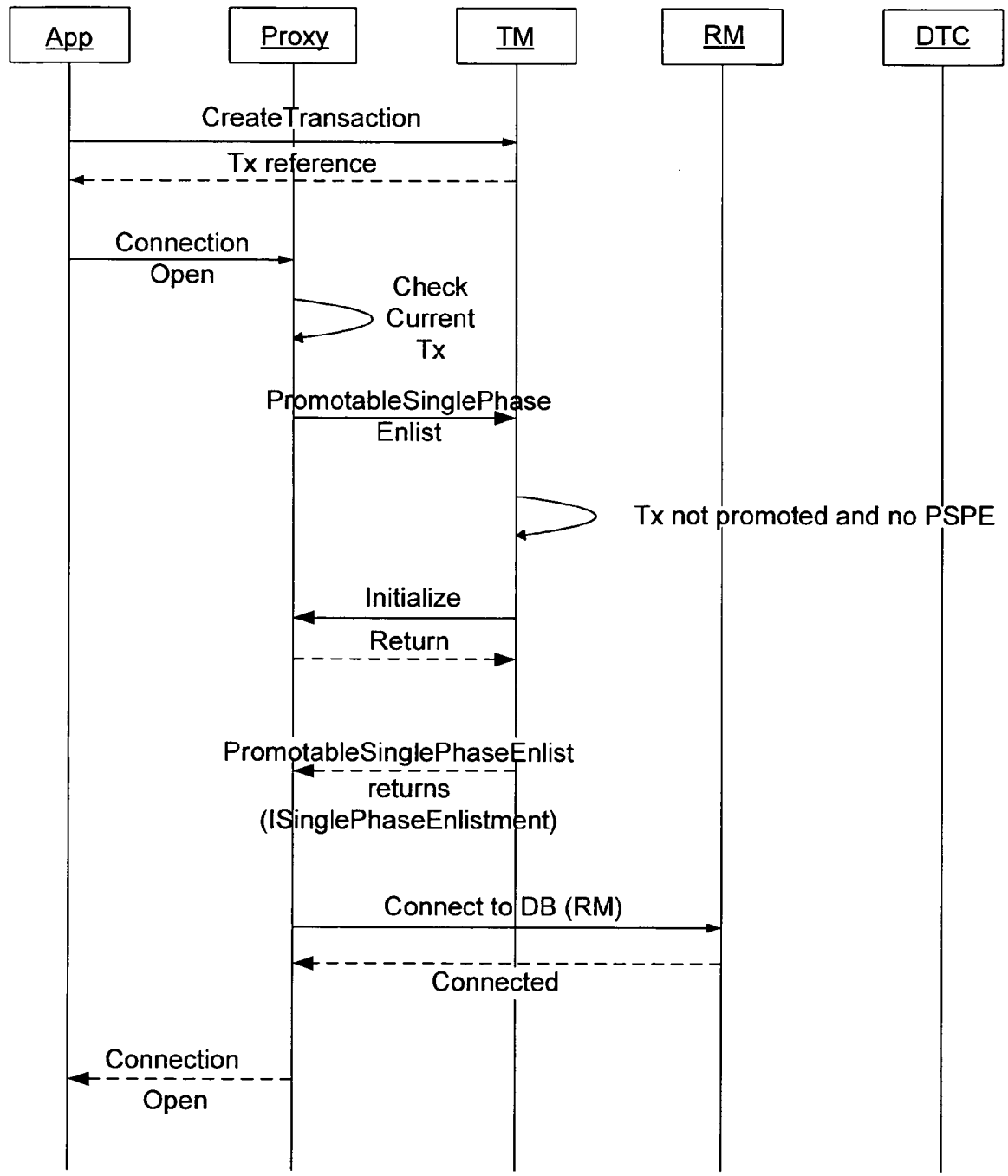
FIG. 3 is an exemplary sequence diagram depicting creation of a promotable transaction.

FIG. 3 is a sequence diagram that provides an alternative exemplary depiction of the process described above for creating a promotable transaction. The sequence diagram depicts a more detailed analysis of specific transactions between elements previously shown and described.

Figure 4:
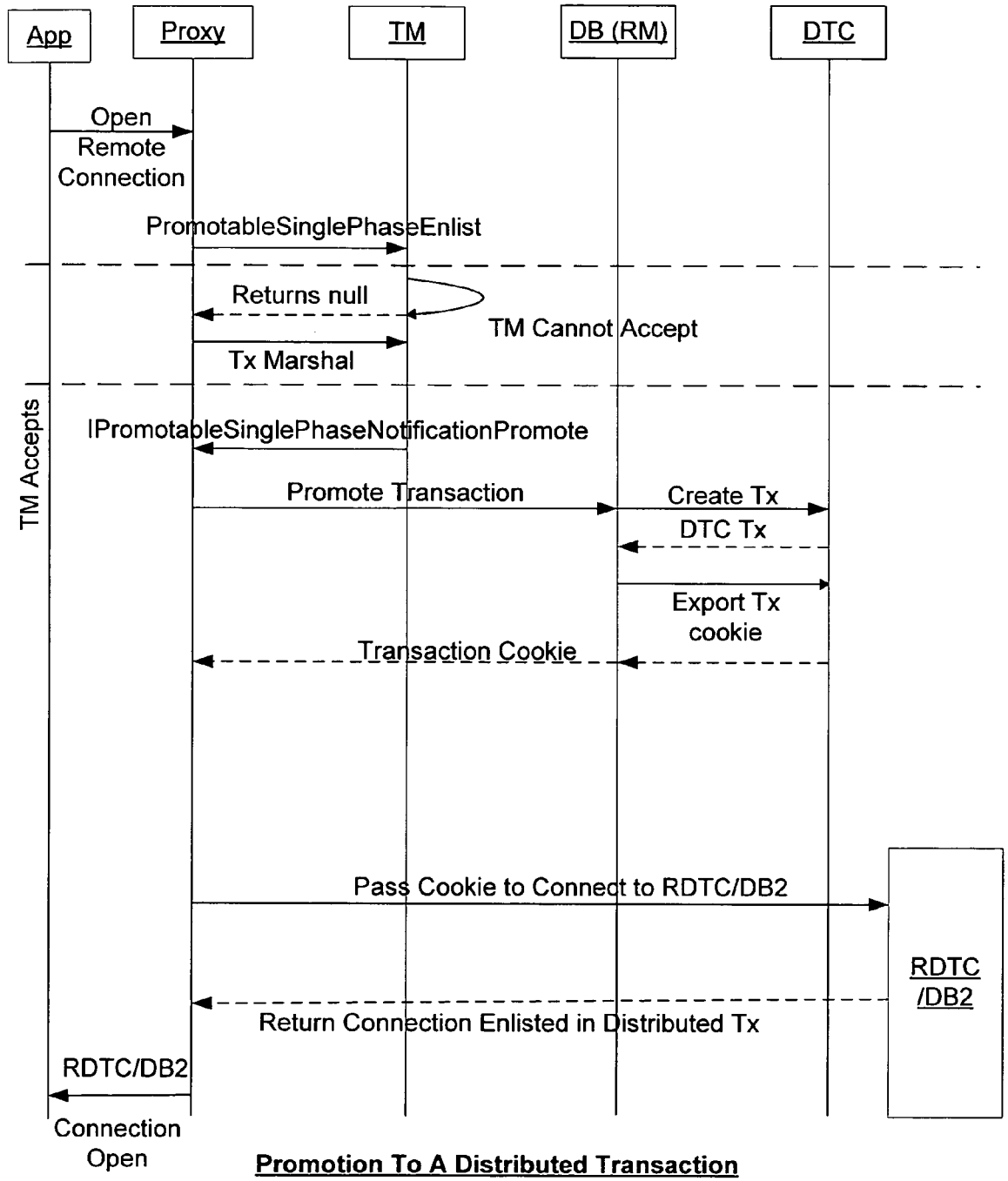
FIG. 4 is an exemplary sequence diagram depicting promotion of a transaction.

FIG. 4 is a sequence diagram that provides another exemplary depiction of the process described above for promoting a transaction to a distributed transaction. Specific transactions between individual elements (as depicted in the exemplary system of FIG. 1) are shown.

Exemplary Implementation: Transaction Manager for Use with COM+ Objects

The transaction manager and promotable enlistments described above can be extended for use with existing COM+ objects so that existing objects do not have to be modified to take advantage of the benefits of such models.

Figure 5:
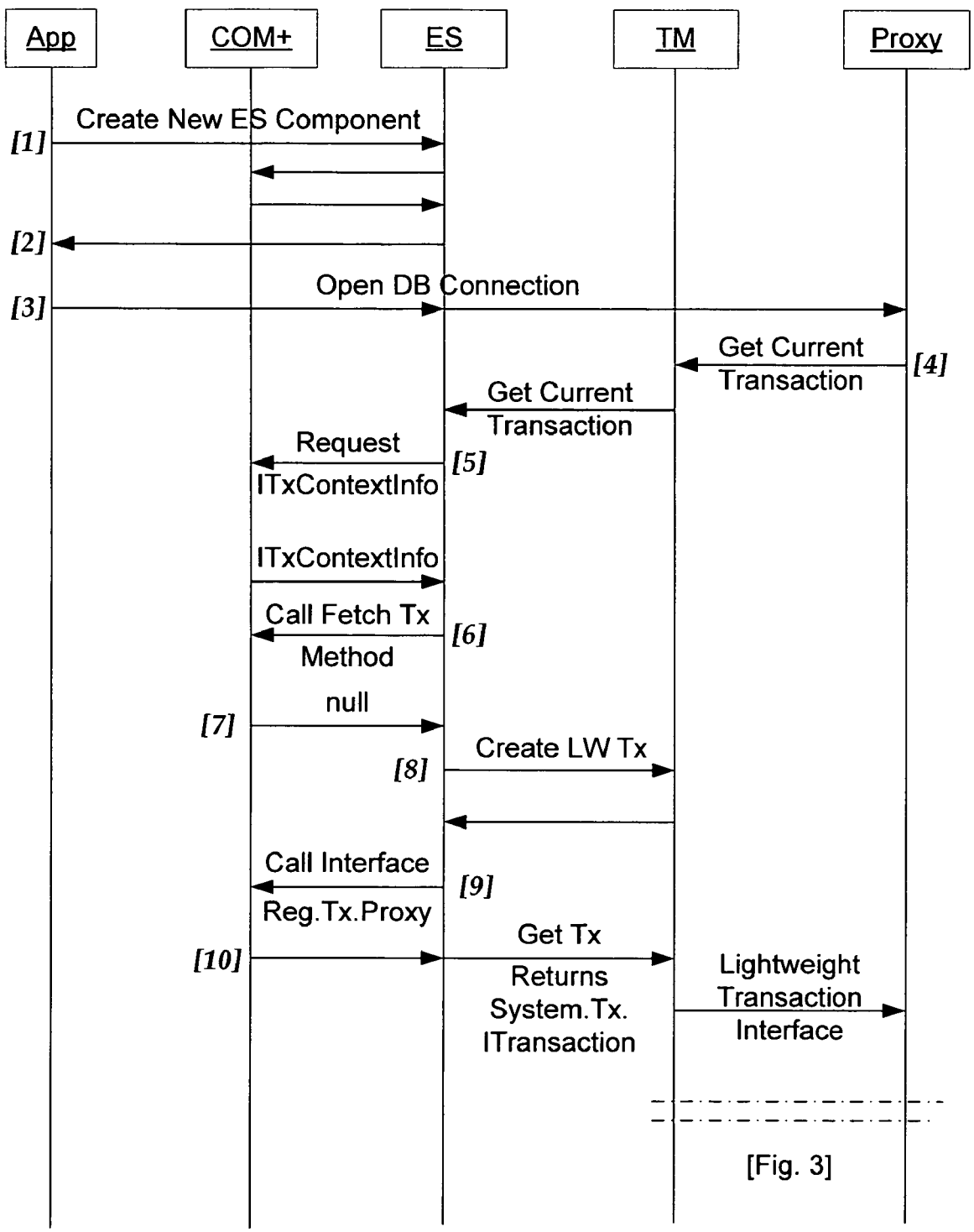
FIG. 5 is an exemplary sequence diagram depicting procedures for using promotable transaction with COM+object.

FIG. 5 is an exemplary sequence diagram of one or more processes that can be used to create a system that allows an existing COM+ object to use promotable transactions. FIG. 5 includes a COM+ representation and an Enterprise Services (ES) representation. Enterprise Services is a managed wrapper for COM+ and is used coincidentally therewith. In the following discussion, continuing reference is made to elements and reference numerals shown in previous figures.

COM+ traditionally creates transactions with a distributed transaction coordinator (DTC 116, FIG. 1), so the problem becomes how to provide a lightweight transaction to the RM proxy (106, FIG. 1) instead of one that is created directly by a DTC. Some of the steps shown in FIG. 5 have been labeled with a reference numeral, which will be used in the following discussion.

At step [1] and step [2], a new ES component is created by an application object. This component is identified as requiring a transaction (e.g. is marked as "requires new"). This means that a COM+component will create a transaction. At step [3], the application calls a method on the COM+ component which opens a database connection (via the RM 106) and/or performs other database operations.

The RM 106 determines the current transaction (step [4]), which is done in step [5] by the ES component requesting a specific interface from the COM+ object (IContextTransactionInformation). The COM+ object returns the requested interface and the ES component calls a COM+FetchTransaction method (step [6]).

If the COM+ object returns null (step [7]), then the ES object creates a transaction at step [8]. Otherwise, the current transaction is used.

At step [9], ES calls a RegisterTransactionProxy interface on the COM+ object. The transaction proxy has three core members: Commit; Abort; and Promote. The transaction proxy informs the COM+ object that if it is polled about this transaction, it can use this transaction proxy to get it.

COM+ is enhanced with logic that if it has' a transaction proxy, it will use that by calling the Commit member or the Abort member if it is performing normal procedures. It also includes logic that if a component requests a native ITransaction interface, it will call the Promote member of the transaction proxy.

Now that the RM proxy 106 has the lightweight transaction interface, it can proceed as previously described. FIG. 3 is a logical continuation of the sequence diagram after the lightweight transaction interface has been provided to the database proxy.

Exemplary Computing Environment

Figure 6:
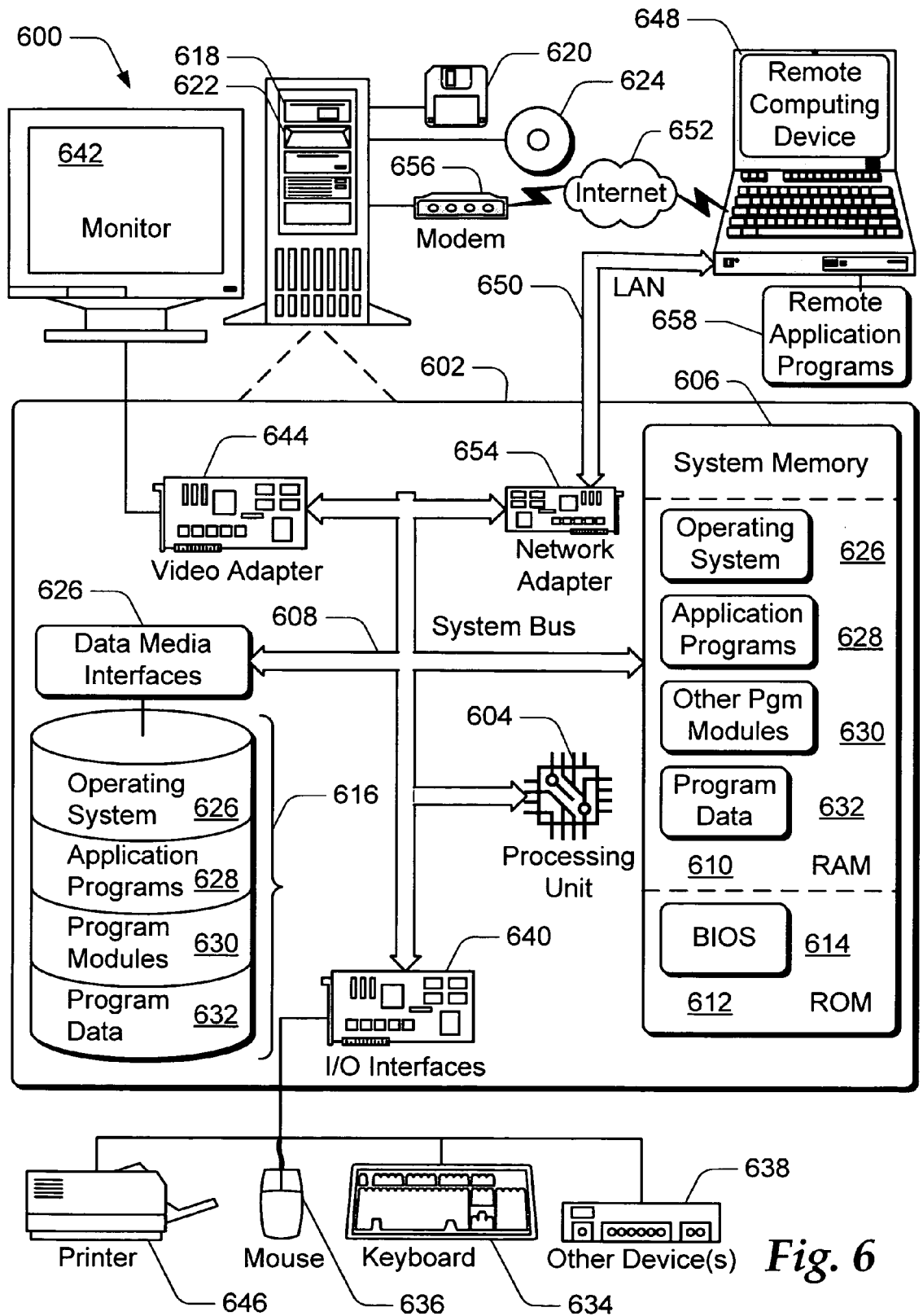
FIG. 6 is a block diagram of an exemplary computing environment in which the techniques described herein may be implemented.

FIG. 6 illustrates an exemplary computing environment 600 within which user interface transition systems and methods, as well as the computing, network, and system architectures described herein, can be either fully or partially implemented. Exemplary computing environment 600 is only one example of a computing system and is not intended to suggest any limitation as to the scope of use or functionality of the architectures. Neither should the computing environment 600 be interpreted as having any dependency or requirement relating to any one or combination of components illustrated in the exemplary computing environment 600.

The computer and network architectures in computing environment 600 can be implemented with numerous other general purpose or special purpose computing system environments or configurations. Examples of well known computing systems, environments, and/or configurations that may be suitable for use include, but are not limited to, personal computers, server computers, client devices, hand-held or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

The computing environment 600 includes a general-purpose computing system in the form of a computing device 602. The components of computing device 602 can include, but are not limited to, one or more processors 604 (e.g., any of microprocessors, controllers, and the like), a system memory 606, and a system bus 608 that couples the various system components. The one or more processors 604 process various computer executable instructions to control the operation of computing device 602 and to communicate with other electronic and computing devices. The system bus 608 represents any number of several types of bus structures, including a memory bus or memory controller, a peripheral bus, an accelerated graphics port, and a processor or local bus using any of a variety of bus architectures.

Computing environment 600 includes a variety of computer readable media which can be any media that is accessible by computing device 602 and includes both volatile and non-volatile media, removable and non-removable media. The system memory 606 includes computer-readable media in the form of volatile memory, such as random access memory (RAM) 610, and/or non-volatile memory, such as read only memory (ROM) 612. A basic input/output system (BIOS) 614 maintains the basic routines that facilitate information transfer between components within computing device 602, such as during start-up, and is stored in ROM 612. RAM 610 typically contains data and/or program modules that are immediately accessible to and/or presently operated on by one or more of the processors 604.

Computing device 602 may include other removable/non-removable, volatile/non-volatile computer storage media. By way of example, a hard disk drive 616 reads from and writes to a non-removable, non-volatile magnetic media (not shown), a magnetic disk drive 618 reads from and writes to a removable, non-volatile magnetic disk 620 (e.g., a "floppy disk"), and an optical disk drive 622 reads from and/or writes to a removable, non-volatile optical disk 624 such as a CD-ROM, digital versatile disk (DVD), or any other type of optical media. In this example, the hard disk drive 616, magnetic disk drive 618, and optical disk drive 622 are each connected to the system bus 608 by one or more data media interfaces 626. The disk drives and associated computer readable media provide non-volatile storage of computer readable instructions, data structures, program modules, and other data for computing device 602.

Any number of program modules can be stored on the hard disk 616, magnetic disk 620, optical disk 624, ROM 612, and/or RAM 610, including by way of example, an operating system 626, one or more application programs 628, other program modules 630, and program data 632. Each of such operating system 626, application programs 628, other program modules 630, and program data 632 (or some combination thereof) may include an embodiment of the systems and methods described herein.

Computing device 602 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, RF, infrared, other wireless media, and any combination thereof.

A user can interface with computing device 602 via any number of different input devices such as a keyboard 634 and pointing device 636 (e.g., a "mouse"). Other input devices 638 (not shown specifically) may include a microphone, joystick, game pad, controller, satellite dish, serial port, scanner, and/or the like. These and other input devices are connected to the processors 604 via input/output interfaces 640 that are coupled to the system bus 608, but may be connected by other interface and bus structures, such as a parallel port, game port, and/or a universal serial bus (USB).

A monitor 642 or other type of display device can be connected to the system bus 608 via an interface, such as a video adapter 644. In addition to the monitor 642, other output peripheral devices can include components such as speakers (not shown) and a printer 646 which can be connected to computing device 602 via the input/output interfaces 640.

Computing device 602 can operate in a networked environment using logical connections to one or more remote computers, such as a remote computing device 648. By way of example, the remote computing device 648 can be a personal computer, portable computer, a server, a router, a network computer, a peer device or other common network node, and the like. The remote computing device 648 is illustrated as a portable computer that can include many or all of the elements and features described herein relative to computing device 602.

Logical connections between computing device 602 and the remote computing device 648 are depicted as a local area network (LAN) 650 and a general wide area network (WAN) 652. Such networking environments are commonplace in offices, enterprise-wide computer networks, intranets, and the Internet. When implemented in a LAN networking environment, the computing device 602 is connected to a local network 650 via a network interface or adapter 654. When implemented in a WAN networking environment, the computing device 602 typically includes a modem 656 or other means for establishing communications over the wide area network 652. The modem 656, which can be internal or external to computing device 602, can be connected to the system bus 608 via the input/output interfaces 640 or other appropriate mechanisms. The illustrated network connections are exemplary and other means of establishing communication link(s) between the computing devices 602 and 648 can be utilized.

In a networked environment, such as that illustrated with computing environment 600, program modules depicted relative to the computing device 602, or portions thereof, may be stored in a remote memory storage device. By way of example, remote application programs 658 are maintained with a memory device of remote computing device 648. For purposes of illustration, application programs and other executable program components, such as the operating system 626, are illustrated herein as discrete blocks, although it is recognized that such programs and components reside at various times in different storage components of the computing device 602, and are executed by the processors 604 of the computing device.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method, comprising:
   requesting a first resource to process a promotable transaction;
   when the promotable transaction can be processed solely using the first resource, processing the promotable transaction using the first resource without using a distributed transaction coordinator, wherein the distributed transaction coordinator coordinates processing of the promotable transaction between multiple resources;
   when the promotable transaction cannot be processed completely by the first resource, promoting the promotable transaction to allow at least a second resource with the first resource to process the transaction, wherein promoting the promotable transaction includes transferring control of the promotable transaction to the distributed transaction coordinator; and
   receiving notification that the promotable transaction has committed in response to a request to commit the promotable transaction.

2. The method as recited in claim 1, wherein the promotable transaction cannot be processed completely by the first resource because the promotable transaction requires the second resource in addition to the first resource.

3. The method as recited in claim 1, wherein the promotable transaction cannot be processed completely by the first resource because a request from the first resource to promote the transaction is received.

4. The method as recited in claim 1, further comprising receiving a call from an application object to process a standard transaction and converting the standard transaction call to a call for a promotable transaction.

5. The method as recited in claim 1, performed in an in-process resource manager.

6. The method as recited in claim 1, further comprising receiving a call from an application object to process the transaction, the call being in accordance with one of multiple protocols and processing the transaction regardless of which protocol is used in the call.

7. A computing device including at least one processor to execute a transaction manager module configured to perform the method as recited in claim 1.

8. The method as recited in claim 1, performed in a database proxy that provides one or more interfaces between one or more databases and an application object.

9. A database system including at least one processor to execute one or more program modules, comprising:
   a database proxy configured to receive calls from application objects to access one or more databases; and
   a transaction manager configured:
      to receive a request from the database proxy to process a database transaction using a first database,
      to process the transaction using the first database without using a distributed transaction coordinator when the transaction can be processed solely using the first database, wherein the distributed transaction coordinator coordinates processing of the transaction between multiple databases,
      to promote the transaction to a fully distributed transaction using at least a second database by transferring the transaction to the distributed transaction coordinator when the transaction cannot be processed solely by the first database, and
      to receive notification that the transaction has committed in response to a request by the transaction manager to commit the transaction.

10. The database system as recited in claim 9, the database proxy further configured to accept application calls according to multiple database communication protocols.

11. The database system as recited in claim 9, the transaction manager further configured to determine when the first database can solely process the transaction.

12. The database system as recited in claim 9, the transaction manager further configured to promote the transaction to a distributed transaction when the transaction requires a connection with at least a second database.

13. The database system as recited in claim 9, the transaction manager further configured to promote the transaction to a distributed transaction when the first database does not support a promotable single phase enlistment.

14. The database system as recited in claim 9, the transaction manager further configured to promote the transaction to a distributed transaction when the transaction is marshaled to a form not recognized by the transaction manager.

15. The database system as recited in claim 9, the transaction manager further configured to promote the transaction to a distributed transaction when at least two durable enlistments are created for the transaction.

16. The database system as recited in claim 9, wherein the transaction manager and the distributed transaction coordinator reside in separate processes.

17. The database system as recited in claim 9, further comprising the distributed transaction coordinator configured to receive a promoted transaction and coordinate processing of the transaction with at least a second database.

18. The database system as recited in claim 9, the transaction manager further configured to retain processing control of the database transaction regardless of a number of volatile resources required in the database transaction.

19. A method, comprising:
   receiving a request to process a transaction using a local resource;
   when the transaction can be processed solely using the local resource, processing the transaction using the local resource without using a distributed transaction coordinator, wherein the distributed transaction coordinator coordinates processing of the promotable transaction between multiple resources;

when the transaction cannot be processed without accessing a remote resource, promoting the transaction to a distributed transaction to gain access to the remote resource including transferring the transaction and any processes associated therewith to the distributed transaction coordinator; and receiving notification that the transaction has committed in response to a request to commit the transaction.

20. The method as recited in claim 19, wherein the transaction cannot be processed without accessing a remote resource because the transaction is a marshaled transaction that cannot be processed locally.

21. The method as recited in claim 19, wherein the transaction cannot be processed without accessing a remote resource because another resource is already enlisted.

22. The method as recited in claim 19, the request originating from a proxy called by an application object.

23. The method as recited in claim 19, the request originating from a transaction manager and wherein the transaction cannot be processed without accessing a remote resource because a notification from the transaction manager to promote the transaction is received.

24. One or more computer-readable storage media containing computer-executable instructions that, when executed on a computer, perform the following steps:

processing a portion of a transaction using a first database connection without using a transaction coordinator when the transaction uses solely the first database connection for processing;

when a second database connection is required to complete processing of the transaction, promoting the transaction to the transaction coordinator configured to coordinate transaction processing between the first database connection and the second database connection; and receiving notification that the transaction has committed in response to a request to commit the transaction.

25. The one or more computer-readable storage media as recited in claim 24, further comprising receiving a call from an application object to process the transaction.

26. The one or more computer-readable storage media as recited in claim 25, wherein the call is formatted according to one of multiple database protocols.

27. The one or more computer-readable storage media as recited in claim 24, further comprising the step of enlisting the first database connection in a manner such that the transaction can be transferred to the transaction coordinator or to a remote transaction coordinator as a part of the promotion step.

28. One or more computer-readable storage media containing computer-executable instructions that, when executed on a computer, perform the following steps:

enlisting a first resource in a transaction;

when the transaction uses solely the first resource, processing the transaction using the first resource without using a transaction coordinator;

when the first resource cannot complete the transaction solely, requesting the first resource to promote the transaction to the transaction coordinator configured to coordinate transaction processing between the first resource and at least a second resource; and receiving notification that the transaction has committed in response to a request to commit the transaction.

29. The one or more computerreadable storage media as recited in claim 28, wherein the first resource cannot complete the transaction solely because a request to include a second resource in the transaction is received.

30. The one or more computer-readable storage media as recited in claim 28, wherein the first resource cannot complete the transaction solely because the transaction has been marshaled to an unsupported transaction format.

31. The one or more computer-readable storage media as recited in claim 28, wherein the first resource cannot complete the transaction solely because the first resource is currently enlisted in a second transaction.

32. The one or more computer-readable storage media as recited in claim 28, wherein the first resource is a database.

33. The one or more computer-readable storage media as recited in claim 28, wherein the first resource is a resource manager configured to handle a promotable enlistment.

34. The one or more computer-readable storage media as recited in claim 28, wherein the transaction coordinator is a remote transaction coordinator.

* * * * *